Oct. 5, 1954 A. VAN DE WIEL 2,691,125
ELECTRIC CIRCUIT-ARRANGEMENT FOR CONTROLLING DIRECT
CURRENT MOTORS DURING THE STARTING PERIOD
Filed March 20, 1951
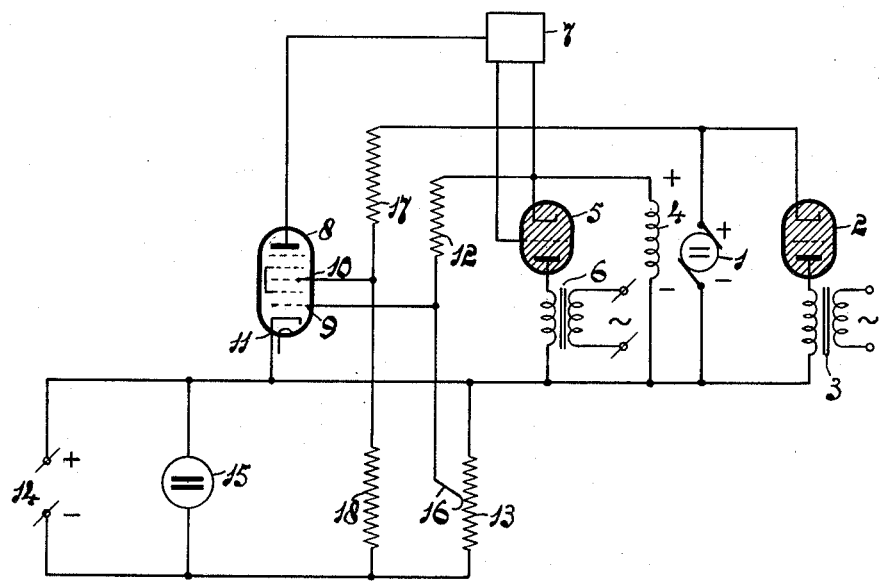
INVENTOR
ALFRED VAN DE WIEL
BY
AGENT Patented Oct. 5, 1954

2,691,125

UNITED STATES PATENT OFFICE 2,691,125

ELECTRIC CIRCUIT-ARRANGEMENT FOR CONTROLLING DIRECT CURRENT MOTORS DURING THE STARTING PERIOD

Alfred van de Wiel, Eindhoven, Netherlands, assignor to Hartford National Bank and Trust Company, Hartford, Conn., as trustee Application March 20, 1951, Serial No. 216,514

Claims priority, application Netherlands April 27, 1950

4 Claims. (Cl. 318—356)

The invention relates to a circuit-arrangement for controlling direct current motors during the starting period, use being made of control means including a rectifier which controls the current flow in the field winding of said motor, thus varying the strength of the magnetic field surrounding said winding to vary the motor speed, said speed increasing with increasing attenuation of said field strength. Provision is made whereby over at least a greater portion of said starting period no field attenuation is present.

When a direct current motor is operating at normal armature and field voltages, the motor speed can only be increased above the normal speed if the field voltage is reduced. In one heretofore known circuit-arrangement this is brought about by a device controlling the rectifier in the field winding circuit, said device comprising means to determine the input voltage of the rectifier, and thus to effectuate the desired reduction of the field voltage. Such means may, for example, be constituted by a potentiometer adjusting a variable voltage which exerts the desired effect on the rectifier. However, when starting the motor under these conditions, a comparatively long starting period will result from the adjustment of the attenuated field. In order to avoid this loss of time, provision is made of further control-means for preventing the field attenuation at least for the greater part of the starting period. In the known circuit-arrangement this is achieved with the use of the starting current, which is materially higher than the normal current and which acts as a controlling quantity.

The principal object of the present invention is to provide an improved speed control circuit for a direct-current motor during its starting period.

According to the invention, in a circuit-arrangement of the kind above, at least part of the armature voltage is used as the control-voltage for the said control-means in order to prevent field attenuation until the armature voltage has reached substantially its normal value.

Greater control stability is possible through use of armature voltage to govern field attenuation than through use of the starting current. In the latter case, due to the high inductance of the armature, the current lags the voltage causing considerable technical difficulties.

In order that the invention may be more clearly understood and readily carried into effect, it will now be described more fully with reference to the accompanying drawing. All the redundant details not referring to the invention have been omitted to simplify the diagram.

The armature 1 of the direct-current motor is supplied through a grid controlled rectifier 2 from the secondary of a transformer 3 whose primary is coupled to an alternating current source.

A field voltage is supplied to field winding 4 by a connection through a rectifier from the secondary of a transformer 6 whose primary is also coupled to an alternating-current source. The rectifier 5 is provided with a control-device 7 with which is also associated a high-vacuum tube 8. The two control-grids 9 and 10 of this tube are each connected to a control-circuit. The control-circuit of the grid 9 includes a cathode 11, the field winding 4, a resistance 12, a potentiometer 13 and a direct-voltage source 14, which is kept constant by a voltage-regulating tube 15.

The potentiometer 13 is used to adjust the motor speed with attenuated field and is provided with a scale, on which are indicated the various numbers of revolutions, for example, from 4000 to 6000. The lowest position of the contact arm 16 corresponds with the highest negative grid voltage for the grid 9 and with the lowest number of revolutions, that is to say 4000. With the arm in this position, the high-vacuum tube 8 passes substantially no anode current, so that the control-device 7 which is coupled to the control grid circuit of rectifying tube 5 allows the rectifying tube 5 to supply its full voltage to the field winding 4 of the motor. When the contact arm 16 is moved upwards, the negative grid voltage drops and the high-vacuum tube 8 starts to supply anode current, and control-device 7 acts to reduce the output voltage of the rectifying tube 5. The motor then starts to rotate at a higher speed with an attenuated field.

The control-grid 10 of the high-vacuum tube 8 is connected to a control-circuit, which includes the cathode 11, the armature 1, a resistor 17, a resistor 18 and the direct-current source 14. The voltages and resistances are altered to accord with one another so that, when the voltage across the armature increases to its normal operating voltage, the grid 10 has a voltage such that this grid just does not act upon the current passing through the high-vacuum tube 8. However, if the armature voltage is lower than the normal operating voltage, the control grid 10 is maintained at a negative potential by voltage source 14 sufficient to cut off the high vacuum tube 8. Therefore, the voltage on grid 9 cannot attenuate the field potential during the starting period. The operation is as follows:

When the motor is adjusted to a speed of, say, 5000 revolutions by moving the contact arm 16 into the position shown, and the motor is then started, it is necessary to supply the entire field voltage from transformer 6 to the field winding 4 in order to run up the motor as fast as possible. Since the contact arm 16 applies a reduced negative grid-voltage to the grid, the high-vacuum tube 8 tends to pass an increased anode current, which in turn causes the control-device 7 to reduce the output voltage of the rectifier 5, thus attenuating the field to the extent required to adjust the speed to 5000 revolutions. However, an attenuated field causes the starting period to become excessive. Therefore, a cut-off voltage is supplied to the grid 10 so that the effect of the grid voltage at grid 9 is suppressed. Owing to the low value of the armature voltage during the starting period, which is caused by low armature resistance and low back—E. M. F., the negative grid voltage dominates via the resistor 18 at the grid 10. Hence, tube 8 is cut off or substantially cut off and the entire field voltage is supplied to field winding 4 from the rectifier 5, thus providing the motor with a high starting torque. When the motor has nearly reached 4000 revolutions (the speed associated with normal armature and field voltages) the armature voltage has increased to such an extent that the grid 10 allows tube 8 to pass current (for example at a grid voltage of 0), so that this tube is then controlled by the grid voltage of grid 9 with the result that the desired attenuated field voltage is supplied to the field winding 4 and the speed increases to the adjusted value of 5000 revolutions.

The adjustment of the grid circuit at the grid 10 is preferably such that as long as the armature voltage is lower than 80 to 90% of the normal operating value, the entire field voltage is supplied to the field winding 4.

What I claim is:

1. Apparatus for controlling a direct-current motor during the starting period, said motor being provided with armature and field windings comprising means to apply an excitation voltage to said armature winding, said voltage being reduced in magnitude during a motor starting period relative to a predetermined magnitude during normal motor operation, means including a controllable rectifier connected in series with said field winding for applying a potential thereto, a current-responsive control device coupled to said rectifier to vary the conductivity thereof and thereby attenuate the field potential accordingly, and a control circuit coupled to said device for supplying thereto an adjustable control current effecting a change in the attenuation of said field potential from a minimum to a maximum value to produce a change in motor speed from a minimum to a maximum value, respectively, said control circuit including means coupled to said armature winding and responsive to the magnitude of voltage thereacross to supply a control current to said device effecting minimum attenuation of said field potential when said armature voltage has a magnitude below said predetermined magnitude.

2. Apparatus, as set forth in claim 1, wherein said control circuit comprises an electron discharge tube having a cathode, first and second grids and an anode, said anode being coupled to said control device to supply current thereto whereby said device effects minimum attenuation when the anode current is at its minimum value, means to apply an adjustable bias voltage to said first grid to vary said anode current from said minimum value to a given maximum value, and means coupling said second grid to said armature winding to apply a portion of said armature voltage thereto to effect reduction of said anode current to said minimum value when said armature voltage falls below said predetermined magnitude.

3. Apparatus, as set forth in claim 2, wherein said means to apply an adjustable bias voltage to said first grid is constituted by a source of bias voltage having its positive terminal connected to said cathode, a potentiometer connected across said source and having an adjustable tap connected to said first grid, said cathode being connected to one end of said field winding, and a resistor connecting the other end of said field winding to said first grid.

4. Apparatus, as set forth in claim 3, wherein said means coupling said second grid to said armature winding comprises a pair of series-connected resistances connected across said armature winding through said potentiometer, and means connecting the junction of said resistances to said second grid, said resistances having relative ohmic values at which the potential applied to said second grid cuts-off said tube when said armature voltage falls a predetermined small amount below said predetermined magnitude.

No references cited.